Patented Oct. 25, 1927.

1,646,793

UNITED STATES PATENT OFFICE.

WILHELM NEELMEIER, OF LEVERKUSEN, NEAR COLOGNE-ON-THE-RHINE, GERMANY, ASSIGNOR TO GRASSELLI DYESTUFF CORPORATION, OF NEW YORK, N. Y., A CORPORATION OF DELAWARE.

BROWN SUBSTITUTED BENZIDINE WOOL DYESTUFFS.

No Drawing. Application filed September 16, 1926, Serial No. 135,994, and in Germany September 25, 1925.

My invention relates to novel disazo dyestuffs and the process of producing same which consists in tetrazotizing certain substituted di-p-amino-diphenyl compounds and coupling the tetrazo compound obtained with one molecular proportion each of a diamino-disulfonic acid of the benzene series and of a 2-amino-8-naphthol-6-sulfonic acid compound.

The substituted di-p-amino-diphenyl compounds useful in my novel process are the benzidine derivatives substituted in 2 and 2' position by halogen or an alkyl group the general formula of which is

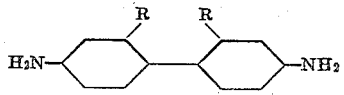

R standing for halogen or an alkyl group. Amongst the diamino-disulfonic acids of the benzene series used as one of the coupling compounds I might mention as particularly useful the 1-3-phenylenediamine-4-6-disulfonic acid. The other coupling compound is either the 2-amino-8-naphthol-6-sulfonic acid itself or an alkyl or aryl substitution product thereof in which the substituent replaces one of the amino-hydrogens. The order in which the coupling compounds are allowed to react with the tetrazo compound is immaterial; the coupling with the 2-amino-8-naphthol-6-sulfonic acid compound is however preferably made in alkaline; e. g., soda alkaline solution.

My novel dyestuffs obtained by this process are of the general formula:

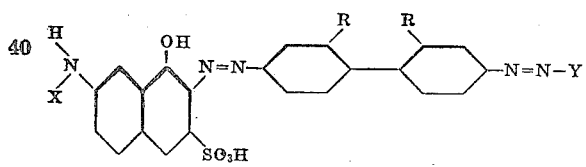

in which R is one of the substituents included in the group comprising the halogen atoms and the alkyl groups, X stands for hydrogen, an alkyl or an aryl group and Y stands for a diamino-disulfonic acid of the benzene series. These novel dyestuffs are in the form of their alkali metal salts dark brown powders, soluble in water with brown and in concentrated sulfuric acid with reddish-blue colors. They dye animal fibers from an acid bath reddish-brown shades particularly fast to fulling. They are, due to their excellent solubility, very valuable for the direct printing of woolen and silk materials, whereby full, reddish-brown shades of excellent fastness to water are produced. The shades obtained from my dyestuffs containing 2-alkyl- or 2-aryl-amino-8-naphthol-6-sulfonic acids are usually more on the yellowish side than those from the dyestuffs made with the straight 2-amino-8-naphthol-6-sulfonic acid.

The following examples will further illustrate my invention, the parts being by weight.

*Example 1.*—253 parts 2-2'-dichloro-4-4'-diamino-diphenyl (dichlorbenzidine) are tetrazotized in the usual manner with 138 parts sodium nitrite and the requisite amount of hydrochloric acid. The so obtained solution of the tetrazo compound is run into an ice cold solution of 268 parts 1-3-phenylene-diamine 4-6-disulfonic acid, keeping the reaction mass all the time acetic acid; the coupling is finished after about ½ hour and the intermediate compound separates. The reaction mass is now made soda alkaline with continued cooling and a solution of 2-amino-8-naphthol-6-sulfonic acid containing an excess of sodium carbonate added all at once. The product is stirred until the second coupling is finished. The dyestuff is then salted out, filtered off and dried. The so obtained product is a dark brown powder, soluble in water with a reddish-brown and in concentrated sulfuric acid with a bluish-red color. By direct printing on woolen or silk goods it produces reddish-brown shades of excellent fastness to water. It has in the free state most probably the formula:

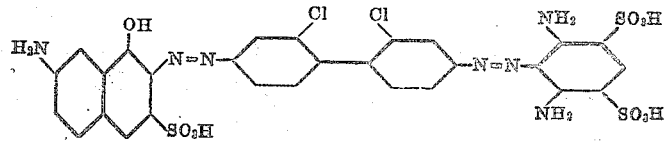

*Example 2.*—212 parts 2-2'-dimethyl-4-4'-diamino-diphenyl (tolidine) are diazotized in the usual manner with 138 parts sodium nitrite and the requisite amount of hydrochloric acid, this solution of the tetrazo compound is then run into an ice cold solution of 268 parts 1-3-phenylene-diamine-4-6-disulfonic acid, containing an excess of sodium carbonate. The formation of the soluble intermediate compound is finished in a few hours. A solution of 261 parts 2-amino-8-naphthol-6-sulfonate of sodium is now added and the reaction mass left standing for several hours at 0° C. until the coupling is completed. The dyestuff is then salted out, filtered off and dried. It is a dark brown powder, soluble in water with a reddish-brown and in concentrated sulfuric acid with a bluish-red color. It dyes wool and silk reddish-brown shades and produces by direct printing on woolen and silk material full reddish-brown shades of excellent fastness to water. It has in the free state most probably the formula:

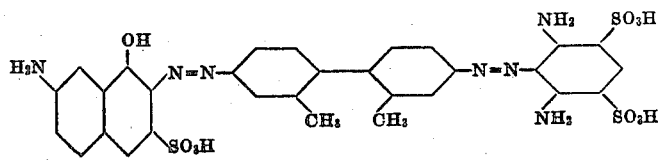

*Example 3.*—253 parts 2-2'-dichloro-4-4'-diamino-diphenyl are tetrazotized in the usual manner and the tetrazo compound first coupled as described in Example 1 with 268 parts 1-3-phenylene-diamine-4-6-disulfonic acid; the intermediate compound is then coupled in soda-alkaline solution with 252 parts 2-methylamino-8-naphthol-6-sulfonic acid. The dyestuff isolated in the usual manner is a dark brown powder, soluble in water with a reddish-brown and in concentrated sulfuric acid with a bluish-red color. Dyed on wool in an acid bath or printed on woolen or silk material it produces fast brown shades, which compared with those obtained from the dyestuffs of Examples 1 and 2 are more yellowish. It has in the free state most probably the formula:

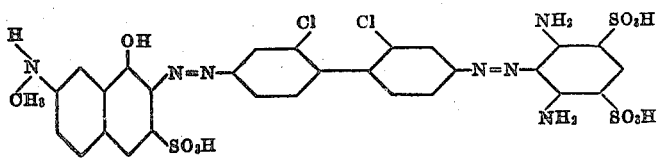

I claim:

1. In processes of producing brown disazo dyestuffs the steps comprising tetrazotizing substituted diamino-diphenyl compounds of the formula:

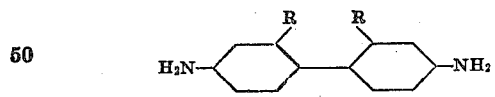

in which R is a halogen atom or an alkyl group and coupling successively and in any chosen order the tetrazo compound obtained with a mono molecular proportion of a diamino-disulfonic acid of the benzene series and in alkaline solution with a mono molecular proportion of a 2-amino-8-naphthol-6-sulfonic acid compound of the formula:

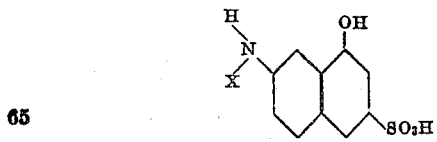

in which X stands for hydrogen, an alkyl or an aryl group.

2. In processes of producing brown disazo dyestuffs the steps comprising tetrazotizing substituted diamino-diphenyl compounds of the formula:

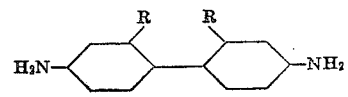

in which R stands for chlorine or an alkyl group and coupling successively and in any chosen order the tetrazo compound obtained with a mono molecular proportion of a m-phenylenediamine-disulfonic acid and in alkaline solution with a 2-amino-8-naphthol-6-sulfonic acid compound of the formula:

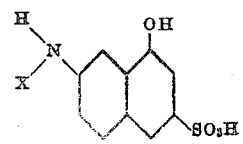

in which X stands for hydrogen, an alkyl or an aryl group.

3. In processes of producing a brown disazo dyestuff the steps comprising tetrazotizing 2-2'-dichloro-4-4'-diamino-diphenyl and coupling the tetrazo compound obtained with a mono molecular proportion of 1-3-phenylenediamine-4-6-disulfonic acid and in alkaline solution with a mono molecular proportion of 2-amino-8-naphthol-6-sulfonic acid.

4. As new products brown disazo dyestuffs having in the free state most probably the formula:

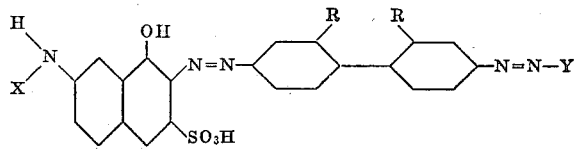

in which R is one of the substituents included in the group comprising the halogen atoms and the alkyl groups, X stands for hydrogen, an alkyl or an aryl group and Y stands for a diamino-disulfonic acid of the benzene series, which in the form of their alkali metal salts are dark brown powders, soluble in water with reddish-brown and in concentrated sulfuric acid with bluish-red colors and dye animal fibers fast brown shades.

5. As new products brown disazo dyestuffs having in the free state most probably the formula:

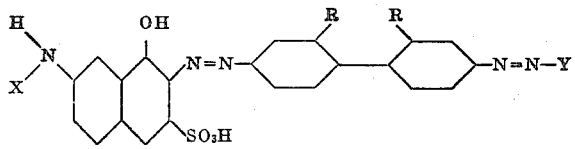

in which R is a chlorine atom or an alkyl group, X stands for hydrogen, an alkyl or an aryl group and Y stands for a metaphenylene-diamine-disulfonic acid, which are in the form of their alkali metal salts dark brown powders, soluble in water with reddish-brown and in concentrated sulfuric acid with bluish-red colors and dye wool and silk brown fast shades.

6. As a new product the disazo dyestuff having in the free state most probably the formula:

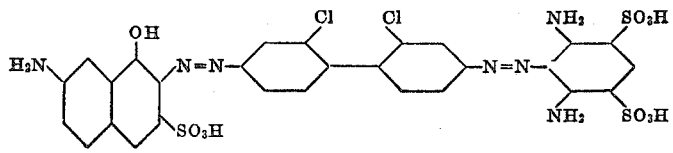

which in the form of its alkali metal salts is a dark brown powder, soluble in water with a reddish-brown and in concentrated sulfuric acid with a bluish-red color, dyeing wool and silk fast brown shades.

In testimony whereof, I affix my signature.

WILHELM NEELMEIER.